United States Patent
Cerf

(10) Patent No.: US 7,726,464 B2
(45) Date of Patent: Jun. 1, 2010

(54) APPARATUS FOR NESTING BOTTLES

(76) Inventor: Alain Cerf, 3301 Gateway Center Blvd., Pinellas Park, FL (US) 37782

( * ) Notice: Subject to any disclaimer, the term of this patent is extended or adjusted under 35 U.S.C. 154(b) by 0 days.

(21) Appl. No.: 12/219,300

(22) Filed: Jul. 18, 2008

(65) Prior Publication Data

US 2010/0012462 A1  Jan. 21, 2010

(51) Int. Cl.
*B65G 47/26* (2006.01)
(52) U.S. Cl. .............. 198/419.3; 198/426; 198/429
(58) Field of Classification Search ............. 198/426, 198/430, 431, 432, 433, 459.6, 463.4, 418.7, 198/419.1
See application file for complete search history.

(56) References Cited

U.S. PATENT DOCUMENTS

| 4,132,305 | A | * | 1/1979 | Mastak | 198/432 |
| 5,667,055 | A | * | 9/1997 | Gambetti | 198/419.3 |
| 6,837,360 | B2 | * | 1/2005 | Schoeneck | 198/426 |
| 6,978,878 | B2 | * | 12/2005 | Chiu | 198/419.3 |
| 2007/0199798 | A1 | * | 8/2007 | Floding et al. | 198/429 |

* cited by examiner

Primary Examiner—James R Bidwell
(74) Attorney, Agent, or Firm—Sam Silverberg

(57) ABSTRACT

The objective of this invention is to provide an apparatus for forming a stable arrangement of bottles so they can be moved on an inline conveyor system. This is accomplished by an apparatus for nesting bottles comprising a first conveyor having lanes of bottles, and a second conveyor, wherein a fixed number of bottles from each lane is released from each lane in a staggered arrangement to facilitate nesting of the released bottles and then pushing and guiding the released bottles from the first conveyor onto a second conveyor so that the bottles form a nested bundle.

14 Claims, 2 Drawing Sheets

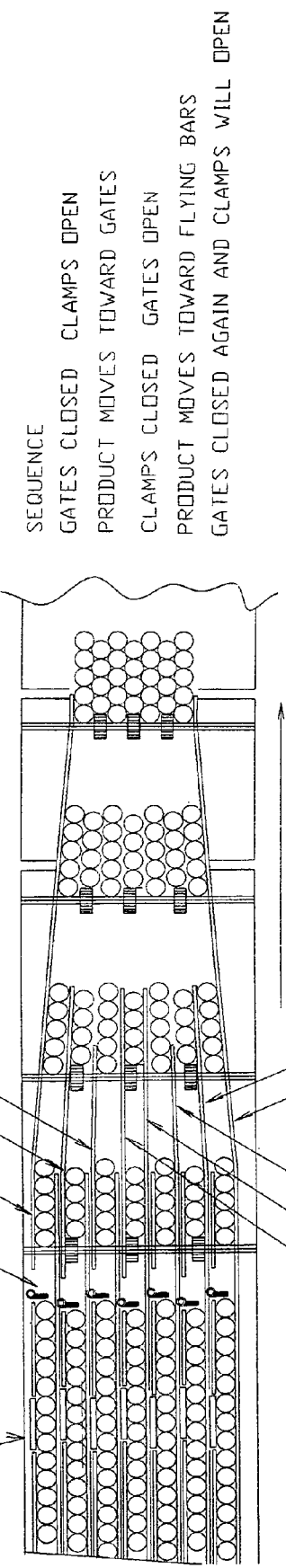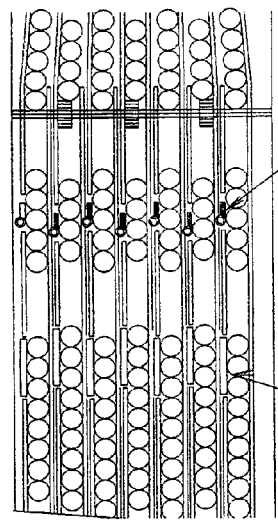

APPARATUS FOR NESTING BOTTLES

FIELD OF INVENTION

This invention is directed to nesting bottles to provide a more stable bundle of bottles for moving bottles on a conveyor. These nested bottles can be moved to a film wrapping station prior than to a heat shrink station.

BACKGROUND OF THE INVENTION

In the prior art, bottles are conventionally place on a tray to provide stability so the bottles can be transported to a film wrapping station. The use of tray requires additional machinery to place the bottles on the tray as well as the tray itself The prior art has recognized the need to provide a more stable structure for moving a collection of bottles on a conveyor. The prior art has formed nested bottles using small bottles. These bottles are positioned into a nested arrangement by pushing them onto a conveyor from the side of the conveyor. This technique to form the nested structure produces slow operational speeds. The maximum effective speed that could be achieved was less then about 5 bundles per minutes. Usually the operational speed was about 2 bundles per minute. The term bottle includes any cylindrical structure, such as a can, that can be utilized with this invention.

SUMMARY OF THE INVENTION

The objective of this invention is to provide a means for forming stable arrangement of bottles so they can be moved on an inline conveyor system at speeds of greater than 5 bundles per minute. Preferably, the speed should be about 40-50 bundles a minute. This is accomplished by an apparatus for nesting bottles comprising a first conveyor having lanes of bottles, a second conveyor, means for releasing a fixed number of bottles from each lane on the first conveyor so that a predetermined number of bottles is released from each lane in a staggered arrangement to facilitate nesting of the released bottles and means for pushing and guiding the released bottles from the first conveyor onto a second conveyor so that the bottles form a nested bundle. Usually a dead plate is located between the first conveyor and the second conveyor to provide room for feeding film wrapping material between the conveyors to wrap the nested bottles.

BRIEF DESCRIPTION OF THE DRAWINGS

FIG. 4 shows releasing bottles in a lane with the gate open.
FIG. 5 shows preventing the release of bottles in a lane with the gate closed.
FIG. 6 shows guides to move the bushing son the fly bar back to its original position.
FIG. 7 shows the bushings with a key way.

DETAILED DESCRIPTION OF THE INVENTION

Figure 1:
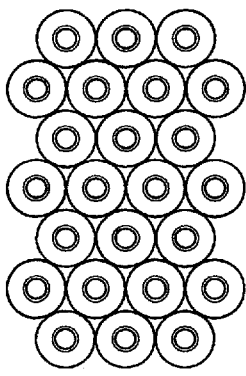
FIG. 1 shows a 12 pack of nested bottles.
Figure 2:
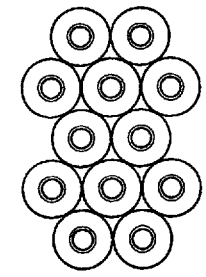
FIG. 2 show a 24 pack of nested bottles.
Figure 3:
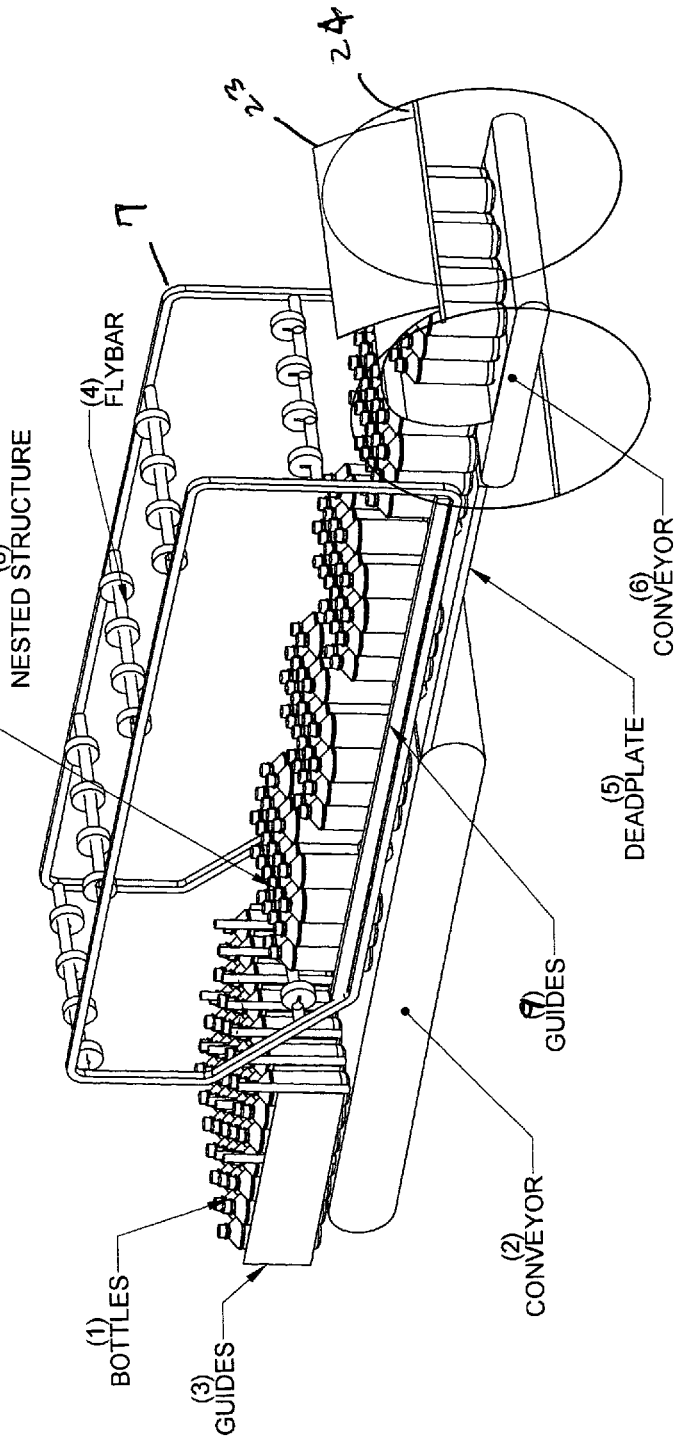
FIG. 3 shows moving lanes of bottles to form a nested bundle.

FIGS. 1 and 2 show a 12 and a 24 pack of nested bottles. The term nesting or nested is when the bottles are staggered so that at least one bottle in one lane makes contact with two bottles in an adjacent lane. When these bottles are nested, the arrangement of bottles provides a stable structure that allows the bottles to be conveyed as a unit. FIG. 3 shows guides 3 separating the bottles resting on conveyor 2 into lanes. After the bottles are released on conveyor 2 in a staggered fashion to facilitate nesting, a revolving scalloped fly bar assembly 7 conveys a scalloped fly bar 4 and pushes the staggered lanes of bottles with the assistance of guides from conveyor 2 across dead plate 5 onto inline conveyor 6 to form a nested bundle of bottles 8 that are film wrapped by film 23. The film is introduced between dead plate 5 and conveyor 6 and the nested bundle is wrapped by bar 24.

After film wrapping, the nested bundle is conveyed to a heat shrink tunnel. The operational speed for a nested bundle of bottles moving on the conveyor is in excess of 5 bundles per minute. The scalloped fly bar 4 usually moves at substantially the same speed as conveyor 2.

FIGS. 4-6 shows the preferred embodiment for automatically forming a nested bundle of bottles. FIGS. 4 and 5 show means for releasing and guiding the bottles on conveyor 2 in a staggered pattern toward a scalloped fly bar 4 to form a nested bundle of bottles. The bottles are maintained in their lanes by guides 3 on conveyor 2. The means for releasing and guiding include a clamp 20 and a gate 21 for each lane of bottles. The clamp 20 and gate 21 can hold the bottles in a fixed position in a lane while the conveyor is moving. The clamp 20 can be movable and can be positioned in a predetermined distance from a gate 21 to accommodate a predetermined number of bottles between the gate and the clamp. When a gate 21 opens, the clamp 20 closes and the bottles between the clamp and the gate are released from each lane and guided by guides 9-16 while being moved by conveyor 3 toward the fly bar. After the gate is closed, the clamp opens and the conveyor moves the bottles toward the gate so the predetermined number of bottles is between the gate and the clamp. This allows for a continuous release of a predetermined number of bottles from each lane. Gate 21 in each lane is positioned in a manner so that the release of the bottles from each gate staggers the released row of bottles to facilitate the nesting of the bottles.

After the bottles are released on conveyor 2 from gate 2, they are guided by guides 9-16 and maintained in their lanes as they move toward the scalloped fly bar 4. The scallops on the fly bar are bushings 7 fixed on fly bar 8 so they cannot rotate about fly bar 8. The bushing can slide along fly bar 8. FIG. 7 shows a bushing 7 having a key track 25 to maintain the bushing in a fixed position on the fly bar and at the same time allows the bushing to slide along the fly bar. As the flying bar revolves the bushing rotates with respect to the bottles. The diameter of the bushing from its center point is approximately equal to the radius of the bottles in order to maintain the proper offset between the lanes of bottles so that the bottles are in positioned to be nested. The variance in the diameter of the bushing is not critical as long as the proper offset is maintained. Guides 9-16 push the bushings into their proper position while guiding the bottles into a pre nested bundle, while the fly bar pushes the bottles on conveyor 2. As the bottles approach the dead plate, guides 9 and 16, guide the bottles into a nested bundle while the bushings are forced to slide into their proper position by the trailing bottles.

FIG. 6 shows guides 17-20 on the top of the fly bar conveyor for pushing the bushings on the fly bar back into its original position so that the fly bar's movement can be repeated.

A dead plate 5 is used of to provide sufficient room for introducing film 23 and a film wrapping bar 24 for wrapping the nested bundles. The location of the dead plate can be at any point downstream of a conveyor after the nested bundle is formed. The dead plate can be omitted and the nested bundle can be moved from the first conveyor to a second conveyor. The dead plate can be replaced by a small conveyor

The invention claimed is:
1. An apparatus for nesting bottles comprising
a first conveyor having lanes of bottles
a second conveyor wherein said first conveyor and second conveyor are inline means for releasing a fixed number of bottles from each lane on the first conveyor so that a predetermined number of bottles is released from each lane in a staggered arrangement to facilitate nesting of the released bottles and,
means for pushing and guiding the released bottles from the first conveyor onto a second conveyor so that the bottles form a nested structure that includes guides that maintain the bottles in their respective lanes to facilitate nesting the bottles and includes a scalloped fly bar where the scallops on the fly bar are bushings that can slide on the fly bar but cannot rotate on the fly bar.

2. An apparatus according to claim 1 wherein a dead plate is located between the first conveyor and the second conveyor.

3. An apparatus according to claim 1 wherein the guides on the first conveyor in combination with fly bar guide the bottles to facilitate nesting.

4. An apparatus according to claim 3 including means for moving the bushings back to their original positions.

5. An apparatus for nesting bottles comprising
a first conveyor having lanes of bottles
a second conveyor wherein said first conveyor and second conveyor are inline means for releasing a fixed number of bottles from each lane on the first conveyor so that a predetermined number of bottles is released from each lane in a staggered arrangement to facilitate nesting of the released bottles which includes a clamp and a gate wherein said clamp can be positioned a predetermined distance from the gate to accommodate a predetermined number of bottles and,
means for pushing and guiding the released bottles from the first conveyor onto a second conveyor so that the bottles form a nested structure that includes guides that maintain the bottles in their respective lanes to facilitate nesting the bottles.

6. An apparatus according to claim 5 wherein the clamp is closed to prevent the movement of the bottles by the first conveyor when the gate is opened so that the first conveyor can move the predetermined number of bottles toward the fly bar.

7. An apparatus according to claim 6 wherein the gate is closed when the clamp is opened so that the first conveyor can move the predetermined number of bottles between the gate and the clamp.

8. A process for nesting bottles comprising
providing lanes of bottles on a first conveyor
releasing a fixed number of bottles from each lane on the first conveyor so that a predetermined number of bottles is released from each lane in a staggered arrangement by using a clamp and a gate to facilitate nesting of the released bottles and
pushing and guiding the bottles from the first conveyor onto a second conveyor which is located inline from the first conveyor while forming a nested bundle of bottles.

9. A process to claim 8 wherein the bottles are pushed across a dead plate located between the first conveyor and the second conveyor.

10. A process according to claim 8 wherein guides are used to guide the bottles.

11. A process according to claim 10 wherein a revolved scalloped fly bar pushes the bottles.

12. A process according to claim 11 wherein the scallops on the fly bar are bushings that can slide on the fly bar but cannot rotate on the fly bar.

13. A process according to claim 8 wherein a nested bundle of bottles move on a conveyor at a rate greater than 5 nested bundles per minute.

14. A process according to claim 13 wherein a nested bundle of bottles move on the conveyor at a rate of 35-60 nested bundles per minute.

* * * * *